Figure 1:
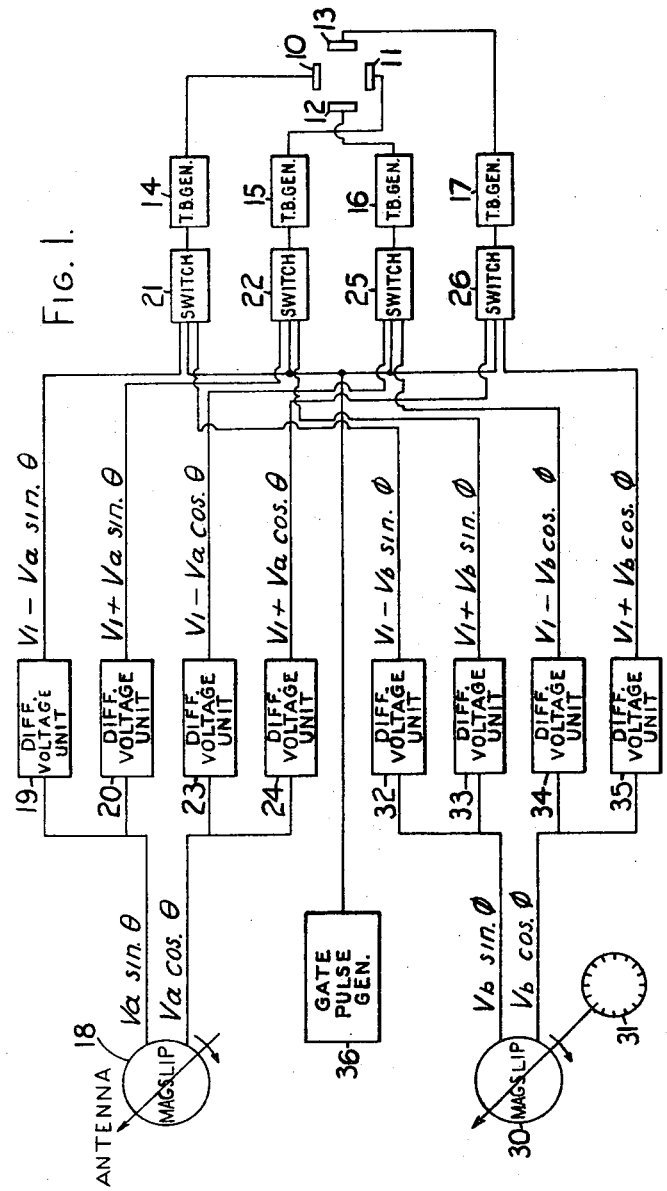

United States Patent Office 2,849,708
Patented Aug. 26, 1958

2,849,708

RADAR DISPLAY SYSTEMS

Robert Matthews, London, England, assignor to The Decca Record Company Limited, London, England, a British company Application September 26, 1955, Serial No. 536,723

12 Claims. (Cl. 343—11)

This invention relates to apparatus for measuring the instantaneous angular position of a cyclically moving body from the position of a repetitively scanned trace on a cathode-ray tube, which trace is moved in synchonism with the movement of said body. The invention is particularly applicable to radar display systems of the kind in which angular bearing (either azimuth or elevation) information is displayed on a cathode-ray tube in the form of a time-base line scan which is displaced on the screen of the cathode-ray tube in accordance with the angular information.

According to this invention, apparatus for measuring the instantaneous angular position of a cyclically moving body by determining the position of a repetitively scanned trace on a cathode-ray tube, which trace is moved in synchronism with the movement of the body by means of fixed deflector coils for deflecting the cathode-ray beam, is characterised in that means are provided for feeding additional scanning signals into the deflector coil system during the intervals between the scans of the aforesaid repetitively scanned trace to produce a marker trace on the screen of the cathode-ray tube corresponding to the setting of a manually adjustable control. By adjusting the manual control, the position of the marker trace can be altered to coincide with the particular instantaneous position of the moving trace which is to be measured and this position can then be measured from the setting of the manual control. By making the channel (or channels) for the marker trace similar to the channel (or channels) for the said repetitively scanned trace, and by using the same deflector coils for both traces the accuracy of angular measurement can be made substantially free from system errors.

As indicated above, the invention is particularly applicable to radar display systems, and, as an example of such a system, a plan position indicator (P. P. I.) may be considered. In more modern P. P. I. display systems, it is generally preferred to employ fixed deflector coils so as to avoid the necessity for mechanically moving deflection coils in the receiver and because a greater accuracy of display can be obtained with fixed than with moving coils. The fixed deflector coils are generally arranged at right angles and are fed with deflecting currents proportional to the sine and cosine of the angular position of the antenna so that the angular position of the trace on the screen of the tube corresponds to the angular position of the antenna. For measuring the bearing of a response, the practice hitherto has been to provide a bearing scale around the periphery of the screen and to provide a cursor which can be set on the response to enable the bearing to be read from the scale. Such arrangements, while adequate for some purposes, have not been found suitable for radar systems in which accurate bearing information is required since the bearing accuracy is inherently limited not only by parallax problems and imperfections of the cathode-ray tube but also by the accuracy of the deflector coils. Experiments have shown that, apart from parallax errors and tube imperfections, the largest errors arise from the deflector coils even although great care is taken in their construction.

It is one of the objects of the present invention to provide an improved form of P. P. I. display system using fixed deflector coils in which these errors in the measurement of bearings are avoided. More generally, however, the invention is applicable not only to P. P. I. displays but to other radar displays in which angular information is displayed in the form of a time-base line scan which is moved on the screen of a cathode-ray tube in accordance with the angular information by means of a fixed deflector coil system, such as for example B-scope displays in which range and bearing are shown as substantially rectangular co-ordinates and E-scope displays in which the trace is moved transversely in accordance with angular elevation of the antenna and R. H. I. displays in which the trace is rotated about its zero range point in accordance with the angular elevation of the antenna.

According to this invention, in a display system for a radar in which angular information is displayed on a cathode-ray tube in the form of a line scan which is moved on the screen of the tube in accordance with the angular position of an antenna by application of line scan signals to a fixed deflector coil system, means are provided for feeding additional line scan signals into the deflector coil system during the interval between the radar display line scans to produce a marker trace on the screen of the cathode-ray tube having a position on the screen which indicates a bearing corresponding to the setting of a manually adjustable control. By this arrangement there is provided a movable bearing marker which can be positioned on the screen to coincide with the bearing to be measured and this bearing is read from the setting of the manual control. The measurement of bearing is quite independent of any parallax errors or tube imperfections or any inaccuracies in the deflector coil construction since the bearing marker is a trace on the screen of the cathode-ray tube similar to the radar display trace and produced by the same deflector coils and furthermore the bearing accuracy is not effected by any stray magnetic or electrostatic fields in the neighbourhood of the cathode-ray tube. The display system of the present invention thus provides a null method for the measurement of bearing with the inherent advantages in accuracy obtained thereby. It is generally possible and is preferably to use the same line-scan generating circuits for producing the deflection currents for both the radar display trace and the bearing marker trace and thus the only source of error in bearing measurement which may occur in the display system would be in the manual control unit. This may be calibrated but, for the most practical purposes, it is readily possible to produce the required accuracy by using a manual control of construction similar to the corresponding control unit for the radar display trace driven by the antenna.

It is not essential to make the bearing marker scan have the same time duration as the radar display scan although this may be desirable for the purpose of ensuring the greatest possible similarity for the conditions of the two scans. If, for example, considering the case of a pulse radar, the radar display scan exceeds half the interval between radar pulses and assuming there is a radar display scan for each pulse, then the bearing marker scan would have to be at a higher speed than the radar display scan.

In one arrangement of the invention, in a display system for a pulse radar in which range and angular information are displayed on a cathode-ray tube in the form of a time-base line scan which is rotated on the screen in accordance with the angular position of the antenna by means of a control unit generating, in accordance with the position of the antenna, two signals controlling the relative amplitudes of scanning currents in a pair of fixed deflector coils, a second control unit is provided which is manually adjustable to generate signals controlling the relative amplitudes of additional scanning signals which are fed into the deflector coils during the intervals between the radar display line scans to produce a movable bearing marker trace on the screen of the cathode-ray tube.

For a P. P. I. display, the amplitudes of the time-base signals for the radar display are made proportional to the sine and cosine of the angular position of the antenna and therefore the manual control unit would be arranged also to produce sine and cosine signals. Conveniently for this purpose magslips are used for both control units. Magslips in common use today have an accuracy which is much better than that of the deflection coil systems such as are used in fixed coil P. P. I. display units and thus, even without special care in the design of the magslips, the present invention readily enables a considerably greater accuracy of bearing measurement on a P. P. I. to be obtained than has been possible in systems using a bearing scale around the screen of the cathode-ray tube. It will be understood that the bearing accuracy of a P. P. I. constructed according to the present invention will depend on the similarity of the two magslips or other sine-cosine signal generators and that, provided the two are similar, the absolute accuracy of the sine and cosine signals is not of great importance.

One advantage of the present invention in its application to a P. P. I. display is that the radar display and bearing marker can be set off the centre of the tube without affecting the ability to measure bearings or detracting from their accuracy.

A further advantage of the present invention is that it is possible to off-centre the bearing marker trace independently of the radar display trace, thereby enabling bearings to be measured of a radar response from some arbitrarily selected point. The accuracy of such bearings from an off-centre point would depend on the accuracy of the deflection coils and therefore may not be so accurate as bearings measured from the position of the radar station but this is of little importance since generally there is no operational requirement for extreme accuracy in such off-centre bearings.

Figure 2:
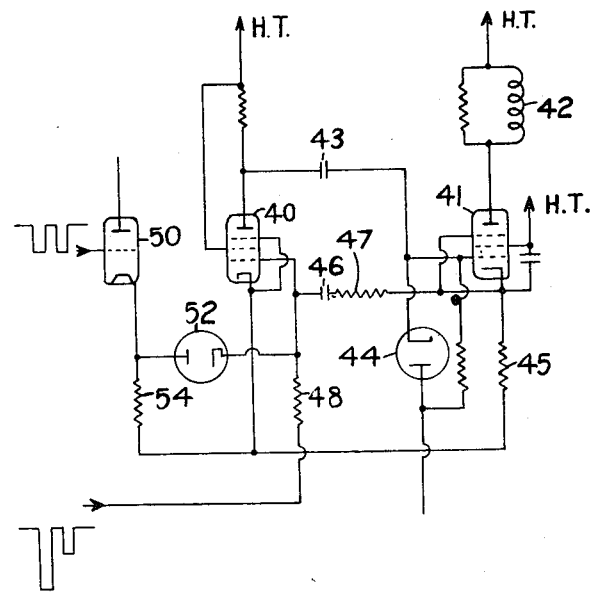

The following is a description of one embodiment of the invention reference being made to the accompanying drawings in which:

Figure 1 is a schematic diagram of the scanning system of a radar plan position indicator; and Figure 2 is a circuit diagram for one of the time-base units of the system of Figure 1.

Referring to Figure 1, a scanning system for a cathode-ray tube of a pulse radar plan position indicator is shown employing four fixed scanning coils 10, 11, 12 and 13 arranged in two pairs 10, 11 and 12, 13 for deflecting the cathode-ray beam of the cathode-ray tube in two directions at right-angles. The four coils are energised respectively by four separate time-base generator circuits 14—17 arranged to produce opposing deflecting fields the resultant of which determine the deflection of the cathode-ray beam in the manner described and claimed in British Patent No. 679,722. The scanning antenna of the radar apparatus is arranged to drive, either directly or indirectly, a magslip 18 which produces two outputs proportional respectively to the sine and cosine of the angular positions of the antenna, $V_a \sin \theta$ and $V_a \cos \theta$ respectively. The output $V_a \sin \theta$ is fed to two differential voltage units 19, 20 which produce respectively output voltages $V_1 - V_a \sin \theta$ and $V_1 + V_a \sin \theta$. The outputs are fed respectively through electronic switches 21, 22 to the time-base generator units 14, 15. The output $V_a \cos \theta$ from the magslip 18 is fed to two differential voltage units 23, 24 to produce respectively voltages $V_1 - V_a \cos \theta$ and $V_1 + V_a \cos \theta$ which are fed through electronic switches 25, 26 to the time-base generator units 16, 17. The time base generator units are arranged to produce saw-tooth currents through the deflector coils proportional in amplitude to the amplitudes of applied control voltages. The arrangement thus far described is similar to the arrangement of British Patent No. 679,722 except for the provisions of the electronic switches 21, 22, 25 and 26 which will be referred to again hereinafter. The voltage control units 19, 20, 23 and 24 may be constructed in the manner described and claimed in British Patent No. 679,723.

For the purpose of the present invention there is provided a second magslip 30 the rotor of which is manually controlled, the manual control being provided with an indicator scale 31. The magslip 30 produces two output voltages $V_b \sin \varphi$ and $V_b \cos \varphi$ representative of the position of the manual control. The voltage $V_b \sin \varphi$ is fed to two differential voltage units 32, 33 to produce respectively voltages $V_1 - V_b \sin \varphi$ and $V_1 + V_b \sin \varphi$ and these two outputs are applied respectively to the electronic switches 21, 22. The voltage $V_b \cos \varphi$ from the magslip 30 is applied to the two differential voltage units 34, 35 which produce outputs respectively of $V_1 - V_b \cos \varphi$ and $V_1 + V_b \cos \varphi$ and these are applied respectively to the electronic switches 25, 26.

The four switches 21, 22, 25 and 26 are controlled by a gate pulse generator 36 so as to operate simultaneously. These switches are arranged so that either the voltages derived from the magslip 18 or the voltages derived from the magslip 30 are applied to the time-base generators 14 to 17. The gate pulse generator is arranged to operate the switches so that these voltages from the two magslips are applied alternately to the time-base generators in the form of pulses so that the beam of the cathode-ray tube is scanned alternately in the direction corresponding to the setting of the antenna magslip 18 (i. e. corresponding to the instantaneous position of the antenna) and in the direction corresponding to the setting of the manually controlled magslip 30. There will thus appear two traces on the screen of the cathode-ray tube one of which will rotate in synchronism with the rotation of the antenna and the other of which will be in a position according to the setting of the manual control of the magslip 30.

Figure 2 illustrates one of the time-base units 14 to 17. These four time-base units are identical and each comprises an amplifying valve 40 and an output valve 41, the latter having the associated deflector coil 42 connected in its anode circuit. The anode of valve 40 is connected by a condenser 43 to the control grid of the output valve 41. A diode 44 is provided to clamp the voltage of the control grid of valve 41 because the duty cycles for the antenna scan and the bearing marker scan may not be the same. The valve 41 has a cathode resistor 45 and, from the cathode, a negative feed-back is taken to the control grid of valve 40, this feed-back circuit comprising a capacity 46 and a resistor 47. The two voltages from the associated differential voltage unit are applied as pulses through a resistor 48 to the control grid of valve 40. The valve 40 is normally conductive and the valve 41 is biased so as to be normally non-conductive.

The operation of valve 40 is controlled by negative-going gate pulses which are applied to the grid of a triode valve 50, which valve is normally conductive. These pulses are applied for the duration of the radar display scan and of the bearing marker scan and serve to cut the valve 50 off for these periods. The valve 50 has a cathode resistor 54 and its cathode is connected to the anode of the diode 52, the cathode of which is connected to the control grid of valve 40. When the valve 50 is cut off, the anode potential of the diode 52 will fall and the diode becomes non-conductive so permitting the control grid of valve 40 to become negative to an extent determined by the amplitude of the pulse from the differential voltage unit applied through resistor 48. The gate pulses applied to valve 50 are derived from the gate pulse generator 36 and occur at the same time as the pulses from the differential voltage units. When the pulses are applied, the grid of valve 40 becomes negative, the condenser 46 charging from the applied control voltage through the resistor 48. The two valves 40, 41 together act as a Miller voltage integrator producing a voltage across the resistor 45 of saw-tooth wave form starting with a step. Since the feed-back voltage is taken from across this cathode resistor 45, so far as this resistor is concerned, the system forms a saw-tooth voltage generator of very low output impedance and hence the anode current of the valve 41 is proportional to this voltage. As shown in the drawing, the deflector coil 42 is shunted by a resistor 49 and, in order to provide a linear saw-tooth current waveform in the coil 42, the feed-back circuit includes a resistor 47 as is explained in further detail in British Patent No. 679,722.

The amplitudes of the successive saw-tooth currents will be proportional to the amplitudes of the applied pulses from the associated electronic switch. Thus the four-time-base generator circuits together, with their associated deflector coils, will produce alternate scans on the screen of the cathode ray tube in directions corresponding to the instantaneous position of the antenna and the setting of the manual control of the magslip 30.

Both the radar display trace and the bearing marker trace in the above described arrangement may be set off from the centre of the screen of the cathode ray tube without affecting the ability to measure bearings and without detracting from their accuracy. Such off-centering is preferably effected in the manner described and claimed in co-pending application Serial No. 536,722, filed September 26, 1955.

I claim:

1. In a cathode ray tube display system having fixed orthogonal deflector means for deflecting the cathode ray beam, the combination of separate waveform generators for feeding sawtooth waveforms to said deflector means having rates of change which are dependent on separate direct control voltages, a first source of sine and cosine voltages coupled to a cyclically moving body to produce sine and cosine direct control voltages representative of the angular position of said body, a second source of sine and cosine direct control voltages, means including a switching device for applying direct control voltages alternatively from said first source or said second source to said waveform generators to produce sine and cosine deflection signals in orthogonal deflector means, and switch control means for operating said switch to connect said second source to said waveform generators during the intervals between successive sawtooth outputs produced by said waveform generators under the control of said first source.

2. In a cathode ray tube display system having fixed deflector coils for deflecting the cathode ray beam, the combination of time base generators for feeding repetitive sawtooth currents to said deflector coils which currents have rates of change dependent on input control voltages applied to said generators, a first source of sine and cosine voltages coupled to a cyclically moving body to produce sine and cosine direct control voltages representative of the angular position of said body, a second source of sine and cosine direct control voltages, circuit means including a switch for applying direct control voltages alternatively from said first source or said second source to said time base generators to produce sawtooth deflection currents in said deflector coils, and switch control means for operating said switch to connect said second source to said time base generators during the intervals between successive sawtooth outputs produced by said sawtooth generators under the control of said first source.

3. In a pulse radar system in which pulse signals are repetitively radiated and in which echoes of those signals received by a cyclically scanning antenna system are displayed as brightness modulation of the trace of a cathode ray display tube, the combination of fixed orthogonal deflector means for the cathode ray tube, waveform generators coupled to said deflector means for feeding sawtooth waveforms thereto having rates of change which are dependent on separate direct control voltages applied to the waveform generators, a first source of sine and cosine voltages coupled to said antenna system to produce sine and cosine direct control voltages representative of the instantaneous angular direction from which signals are being received by the antenna system, a second source of sine and cosine direct control voltages, circuit means including a switching device for alternatively applying direct control voltages from said first source or from said second source to said waveform generators to produce sine and cosine deflection signals in said orthogonal deflector means, and switch control means synchronized with the transmitted radar pulses for operating said switching device to connect said first source to said waveform generators for a period after each transmitted pulse so as to produce a radar display trace on the cathode ray tube which is moved in synchronism with the movement of the antenna receiving beam and to connect said second source to said waveform generators during intervals between cathode ray beam scans produced under the control of said first source.

4. The combination as claimed in claim 3 wherein said first source of sine and cosine signals comprises a magslip.

5. The combination as claimed in claim 3 wherein said second source comprises a manually adjustable magslip.

6. In a pulse radar system in which pulse signals are repetitively radiated and in which echoes of those signals received by a cyclically scanning antenna system are displayed as brightness modulation of the trace of a cathode ray display tube, the combination of fixed orthogonal deflector means for the cathode ray tube, two waveform generators coupled respectively to two orthogonal deflector means for feeding sawtooth waveforms thereto having rates of change dependent on separate direct control voltages applied to the two waveform generators, first and second control units each producing two direct control voltages, circuit means including a switching device for applying voltages alternatively from said first or said second control units to said waveform generators, said first control unit being coupled to said antenna system to generate two control voltages which, when applied respectively to said waveform generators will cause the latter to produce deflection signals for the cathode ray beam deflecting the latter in a direction representative of the instantaneous angular direction from which echo signals are being received, and switch control means synchronized with the transmission of the radar pulses for operating said switching device to connect said first control unit to said waveform generators to produce a trace after each transmitted pulse and to connect said second control unit to said waveform generators during intervals between successive traces produced under the control of said first control unit.

7. In a pulse radar system in which pulse signals are repetitively radiated and in which echoes of those signals received by a cyclically scanning antenna system are displayed as brightness modulation of the trace of a cathode ray tube, the combination of fixed orthogonal deflector coils for the cathode ray tube, two sawtooth current generators coupled respectively to two orthogonal deflector coils for feeding sawtooth current waveforms thereto having rates of change proportional to separate direct control voltages applied to the two sawtooth current generators, first and second control units each producing direct sine and cosine control voltages, circuit means including a switching device for applying voltages alternatively from said first or said second control unit to said sawtooth current generators, said first control unit being coupled to said antenna system to generate sine and cosine voltages representative of the instantaneous angular direction from which echo signals are being received, and switch control means synchronized with the transmission of the radar pulses for operating said switching device to connect said first control unit to said sawtooth current generators to produce a trace after each transmitted pulse and to connect said second control unit to said sawtooth current generators during intervals between successive traces produced under the control of said first control unit.

8. In a pulse radar system in which pulse signals are repetitively radiated and in which echoes of those signals received by a cyclically scanning antenna system are displayed as brightness modulation of the trace of a cathode ray tube, the combination of fixed orthogonal deflector means for the cathode ray tube, scanning signal generator means coupled to said deflector means and operatively controlled by said antenna system to feed deflection signals to said deflector means for deflecting the cathode ray beam trace radially in a direction corresponding to the instantaneous direction of reception of said scanning antenna system, control means for controlling said signal generator means so that the radial traces are synchronized to start with each transmitted pulse, and further control means for said scanning signal generator means operative to cause the latter to feed to said deflector means further deflection signals during the intervals between the successive radial traces controlled by the first mentioned control means.

9. A cathode ray tube display system comprising a cathode ray tube having fixed orthogonal deflector means, waveform generators coupled respectively to said deflector means for applying sawtooth scanning deflection signals thereto the slopes of which are dependent on control voltages applied to the waveform generators, first and second control units each arranged to provide separate control voltages for each of the waveform generators, circuit means including a switching device for applying voltages alternatively from said first or said second control unit to said waveform generators, and control means arranged both to trigger said waveform generators and to operate said switching device so that said waveform generators produce a regularly recurring succession of deflection traces of the cathode ray beam under the control of one of the control units and produce traces under the control of the other control unit during the intervals between successive traces of the regularly recurring traces produced under the control of said one unit.

10. In a pulse radar system in which pulse signals are repetitively radiated and having a rotating receiving antenna system, the combination of a cathode ray tube having fixed orthogonal deflector means, first and second time base generators adapted to produce sawtooth output signals having slopes proportional to applied direct control voltages, a sine and cosine signal generator coupled to said antenna system to produce sine and cosine direct voltage signals representative of the angular bearing of said antenna system, a manually controlled sine and cosine direct voltage signal generator, a first circuit including a first electronic switch for feeding signals alternatively from said sine and cosine signal generators representative either of the sine of the angular position of the antenna or of the sine of the angular position represented by the setting of the manually controlled sine and cosine signal generator to said first time base generator to control the slope of the sawtooth output signal produced thereby, a second circuit including a second electronic switch for feeding signals alternatively from said sine and cosine signal generators representative either of the cosine of the angular position of the antenna or of the cosine of the angular position represented by the setting of the manually controlled sine and cosine signal generator to said second time base generator to control the slope of the sawtooth output signal produced thereby, and a switch control circuit arranged to operate said first and second electronic switches in synchronism.

11. The combination as claimed in claim 10 wherein said switch control circuit comprises a gating pulse generator arranged to produce pairs of successive gating pulses.

12. The combination as claimed in claim 10 wherein said deflector means comprises orthogonal deflector coils and wherein each of said time base generators comprises an output tube having at least a plate, a cathode and a control grid, an amplifying tube having at least a plate, a cathode and an input grid, circuit means connecting the associated deflector coil in series with the plate of the output tube, circuit means coupling the plate of the amplifying tube to the control grid of the output tube, a cathode circuit for said output tube including a resistor, and an integrating capacity connected between the cathode of the output tube and the input grid of the amplifying tube to feed the voltage developed across said resistor to the input grid of the amplifying tube whereby the two tubes constitute a voltage integrator producing a sawtooth voltage across said resistor.

References Cited in the file of this patent
UNITED STATES PATENTS 2,712,647    Sherwin _____ July 5, 1955